United States Patent Office.

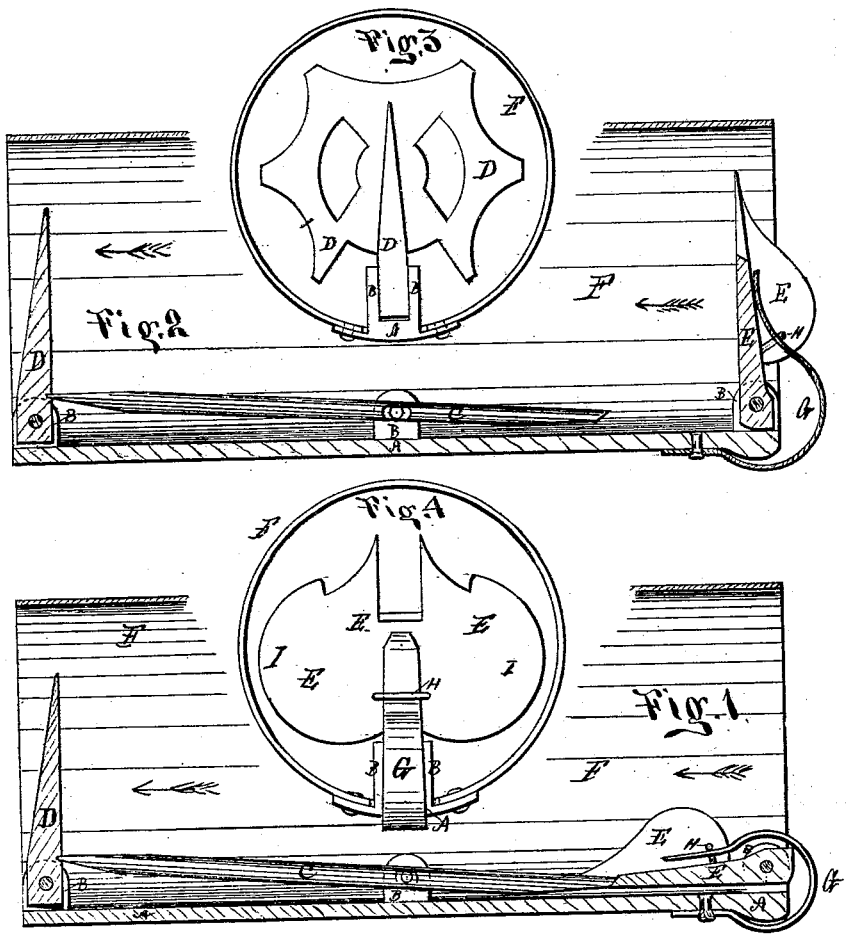

ROMANSO E. WOOD, OF SANTA CRUZ, CALIFORNIA.

Letters Patent No. 109,789, dated November 29, 1870.

IMPROVEMENT IN ANIMAL-TRAPS.

The Schedule referred to in these Letters Patent and making part of the same.

*To all whom it may concern:*

Be it known that I, ROMANSO E. WOOD, of Santa Cruz, in the county of Santa Cruz and State of California, have invented an improved Animal-Trap; and I do hereby declare that the following is a full and exact description of the same, reference being had to the accompanying drawing and to the letters of reference marked thereon.

My invention relates to that class of animal-traps in which the animal, upon entering, causes a door or gate to close behind it to prevent its escape; the object of which is to provide a trap that will be more certain and positive in its action than those in general use, and that will not alarm the animal until too late for him to escape.

To enable others skilled in the art or science to which it most nearly appertains to make and use my invention, I will proceed to describe fully its construction and operation.

In the annexed drawing—

Figure 1 is a longitudinal section of such a trap, set.

Figure 2 is a longitudinal section of the same trap, sprung.

Figures 3 and 4 are end views of the same.

All the working parts of this machine are secured to a bed-piece or frame, A, having lugs B, to which the rod C and doors D and E are hinged.

F is a cylindrical tube, formed by bending a suitable piece of sheet metal and securing its edges by rivets to lugs on the bed-piece A.

The cylinder may be slotted or formed of strips of metal, if found more convenient.

The rod C is provided with an elongated slot for receiving the pin by which it is hinged to the lug, in order that said rod C may have end motion.

The door D has only a slight motion on its hinge, and can never be opened sufficiently to allow the animal to pass by it, while the door E can only be opened inward or moved through the angle included between the positions shown in figs. 1 and 2.

G is a stout steel spring, having one end riveted to the bed-piece A, and the other end passing through a staple, H, secured to the door E.

The spring G has a constant tendency to force or maintain the door E in a vertical position, closing the tube.

The wings I of door E are curved as shown, in order to make it possible to place the said door in the position shown in fig. 1.

It will be seen, by reference to fig. 1, that the inclined face on one end of the rod C is in contact with an inclined face on the door E, and consequently the pressure of the door against that end of the rod has a tendency to move the opposite end downward and the rod itself on end, and the angle of inclination of the plane of contact should be such that when the parts are in the position shown in the drawing the friction of the parts and the downward tendency of the end of the rod will overcome the tendency to move on end, and thus retain the parts in that position until a slight pressure applied to the door D, in the direction of the arrows, allows the rod C to move endwise and release the door E; and it is evident that if an animal should enter the trap when set, as shown in fig. 1, and proceed in the direction of the arrows until his nose comes in contact with door D, the pressure thus produced upon the door D would spring the trap and cause the door E to close behind the animal and render his escape impossible.

The size and proportion of the parts may be varied according to the size and habits of the animal to be caught, and the working parts may be secured directly to the inside of any suitable tube instead of to plate A.

Having thus described my invention,

What I claim, and desire to secure by Letters Patent, is—

The doors D and E, spring G, rod C, and bed-piece or frame A, and tube F, when combined, arranged, constructed, and operated substantially as described and for the purpose set forth.

In witness whereof, I have hereunto set my hand and seal.

ROMANSO E. WOOD. [L. S.]

Witnesses:
C. W. M. SMITH,
H. S. TIBBEY.